US008560214B1

(12) United States Patent
Krenz et al.

(10) Patent No.: US 8,560,214 B1
(45) Date of Patent: Oct. 15, 2013

(54) METHOD AND SYSTEM FOR CAPTURING AND DISPLAYING AIRCRAFT TAXI ROUTES

(75) Inventors: Michael J. Krenz, Cedar Rapids, IA (US); Pamela K. Hahn, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 852 days.

(21) Appl. No.: 12/156,969

(22) Filed: Jun. 6, 2008

(51) Int. Cl.
*G06G 7/76* (2006.01)

(52) U.S. Cl.
USPC .......................................................... 701/117

(58) Field of Classification Search
USPC ............. 701/120, 122, 117; 342/353, 357.45, 342/357.63
See application file for complete search history.

(56) References Cited

U.S. PATENT DOCUMENTS

| | | | | |
|---|---|---|---|---|
| 5,375,058 A * | 12/1994 | Bass | ............................. | 701/120 |
| 6,064,322 A * | 5/2000 | Ohira | ....................... | 340/995.18 |
| 6,112,141 A * | 8/2000 | Briffe et al. | ....................... | 701/14 |
| 6,311,128 B1 * | 10/2001 | Prum et al. | ..................... | 701/213 |
| 7,272,489 B2 * | 9/2007 | Tu | ................................... | 701/200 |
| 7,330,147 B2 * | 2/2008 | Khatwa | ........................... | 342/29 |
| 2004/0006412 A1 * | 1/2004 | Doose et al. | ..................... | 701/10 |
| 2005/0157672 A1 * | 7/2005 | Dodel | .......................... | 370/325 |
| 2006/0238402 A1 * | 10/2006 | Khatwa | ........................... | 342/29 |
| 2008/0275642 A1 * | 11/2008 | Clark et al. | .................... | 701/208 |

* cited by examiner

*Primary Examiner* — Gerald J. O'Connor
*Assistant Examiner* — Edward Winston, III
(74) *Attorney, Agent, or Firm* — Donna P. Suchy; Daniel M. Barbieri

(57) ABSTRACT

An aircraft taxi route display system may include a user interface including a display device and a user input, a computer including a computer processor and a computer storage device, wherein the computer is in communication with the user interface, and/or a communications link capable of receiving at least one airport characteristic, wherein the communications link is in communication with the computer processor, and the computer processor is configured to present an aircraft taxi route. A method may include capturing at least one of at least one taxi turn direction or at least one taxi distance, accepting from a user input a selection of at least one of at least one taxi turn direction or at least one taxi distance, clearing an aircraft taxi route from the selection of at least one of at least one taxi turn direction or at least one taxi distance, and displaying the aircraft taxi route.

16 Claims, 13 Drawing Sheets

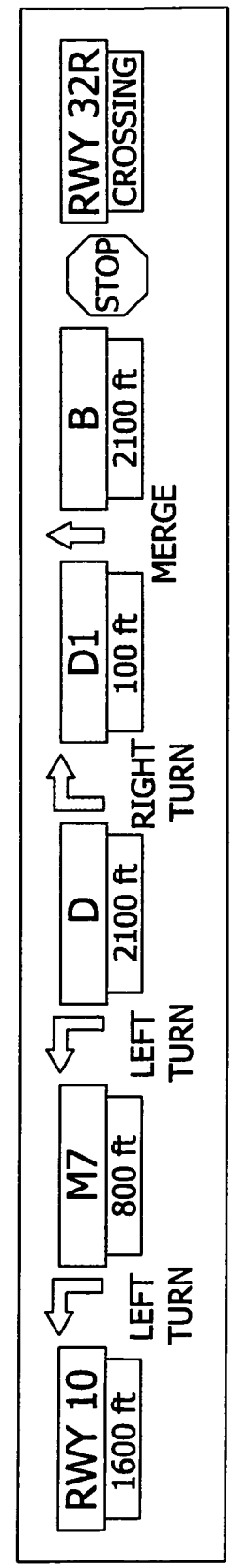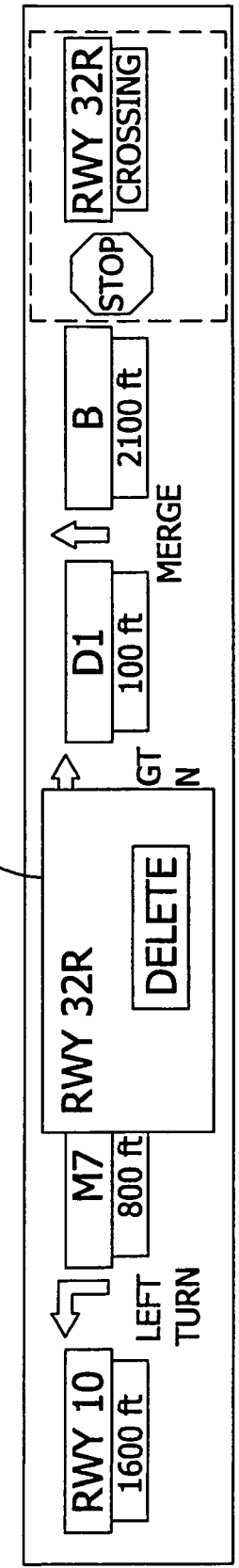
FIG. 8
FIG. 9

METHOD AND SYSTEM FOR CAPTURING AND DISPLAYING AIRCRAFT TAXI ROUTES

TECHNICAL FIELD

The present invention generally relates to the field of aircraft traffic management, and more particularly to a method for capturing and displaying an aircraft taxi route.

BACKGROUND

Aircraft operating on the ground, which may move between runways and terminal gates in close proximity, may often have difficulty in determining a path to take due to sometimes distracting lights and other aircraft. Nighttime operations may be especially challenging when trying to discern the path to take amongst the many possible taxiways and exit/entrance paths.

SUMMARY

The present disclosure is directed to a system and method for providing an aircraft taxi route to an aircraft.

A aircraft taxi route display system may include a user interface including a display device and a user input; a computer including a computer processor and a computer storage device, wherein the computer is in communication with the user interface; and/or a communications link capable of receiving at least one airport characteristic, wherein the communications link is in communication with the computer processor, and the computer processor is configured to present an aircraft taxi route.

A method may include capturing at least one of at least one taxi turn direction or at least one taxi distance; accepting from a user input a selection of at least one of at least one taxi turn direction or at least one taxi distance; clearing an aircraft taxi route from the selection of at least one of at least one taxi turn direction or at least one taxi distance; and/or displaying the aircraft taxi route.

It is to be understood that both the foregoing general description and the following detailed description are exemplary and explanatory only and are not restrictive of the invention claimed. The accompanying drawings, which are incorporated in and constitute a part of the specification, illustrate an example of the invention and together with the general description, serve to explain the principles of the technology.

BRIEF DESCRIPTION OF THE DRAWINGS

The numerous objects and advantages of the present technology may be better understood by those skilled in the art by reference to the accompanying figures in which:

FIG. 8 illustrates an aircraft taxi route summary.

FIG. 9 illustrates an aircraft taxi route summary;

DETAILED DESCRIPTION

Figure 1:
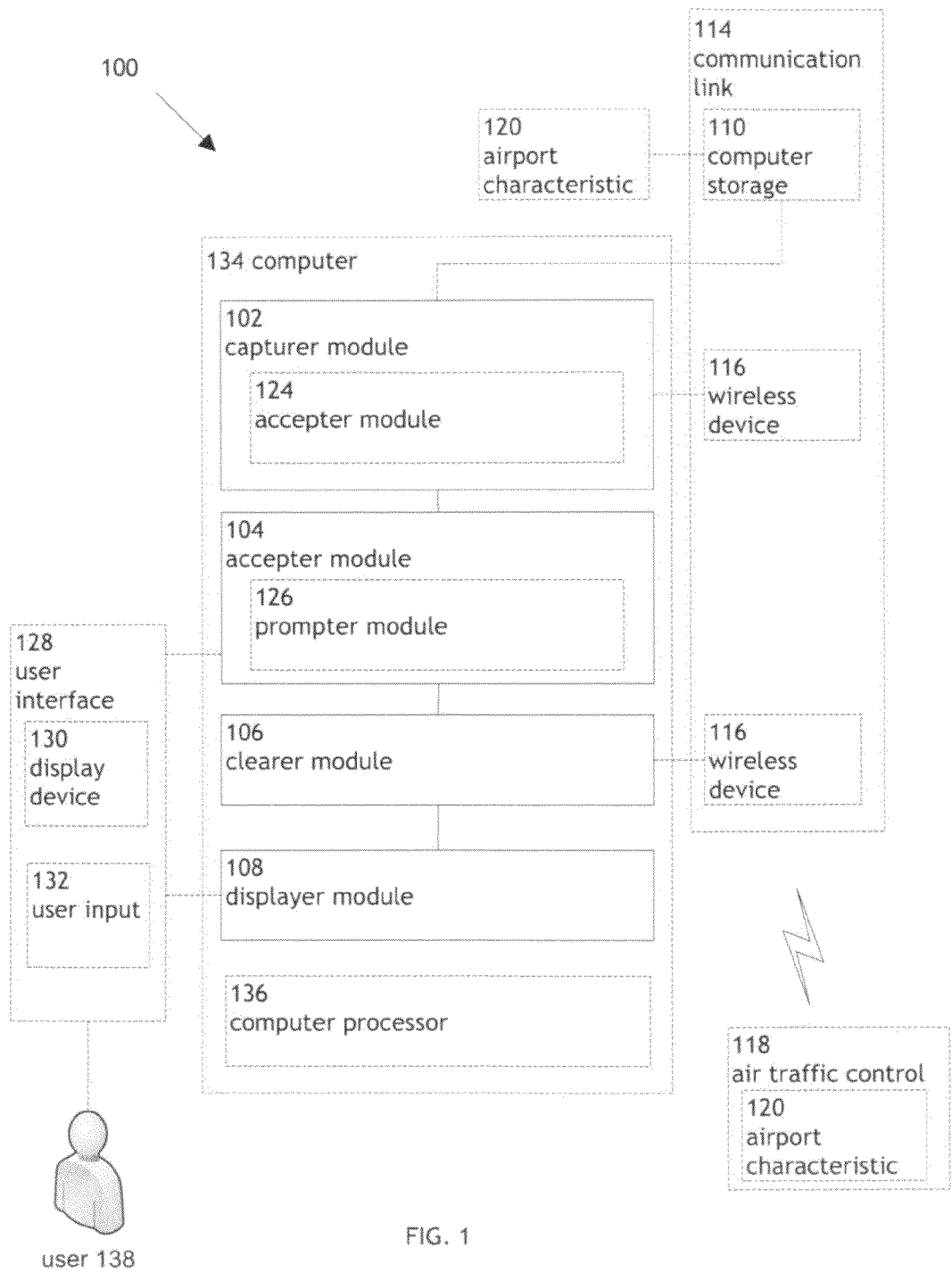
FIG. 1 illustrates an exemplary environment in which one or more technologies may be implemented.
Figure 2:
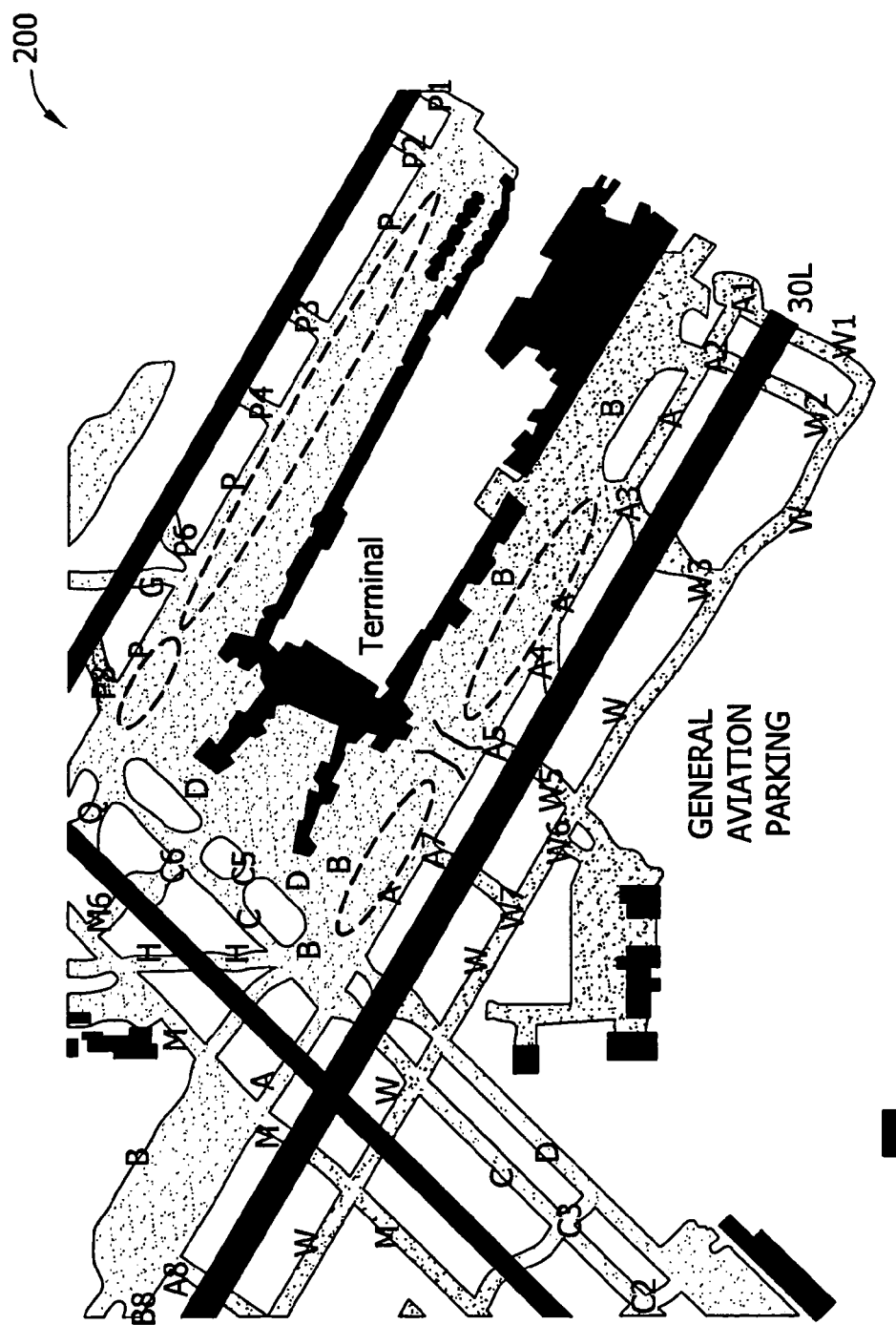
FIG. 2 illustrates an airport diagram display.
Figure 3:
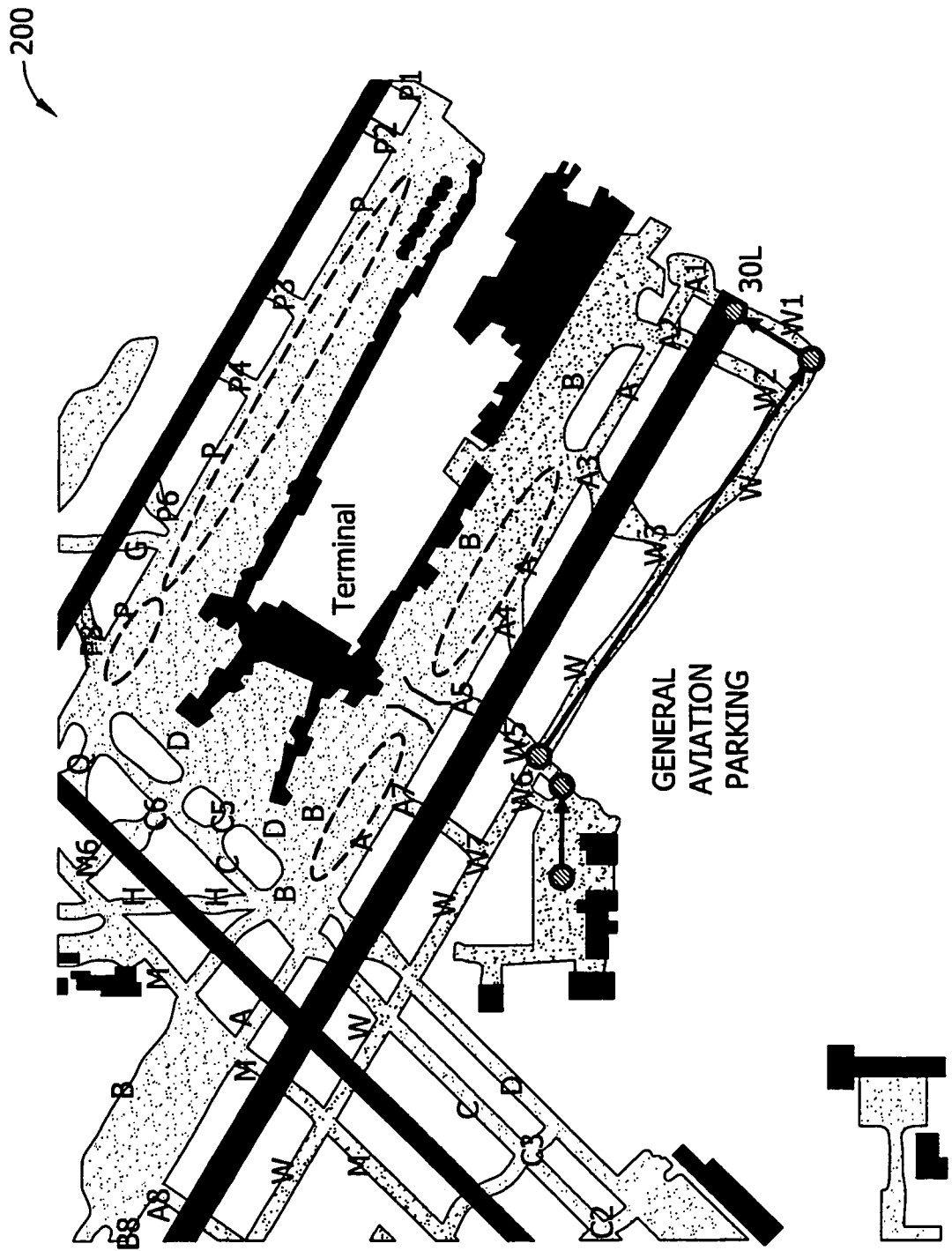
FIG. 3 illustrates an airport diagram display.

The following discussion is presented to enable a person skilled in the art to make and use the present teachings. Various modifications to the illustrated examples will be readily apparent to those skilled in the art, and the generic principles herein may be applied to other examples and applications without departing from the present teachings. Thus, the present teachings are not intended to be limited to examples shown, but are to be accorded the widest scope consistent with the principles and features disclosed herein. The following detailed description is to be read with reference to the figures, in which like elements in different figures have like reference numerals. The figures, which are not necessarily to scale, depict selected examples and are not intended to limit the scope of the present teachings. Skilled artisans will recognize the examples provided herein have many useful alternatives and fall within the scope of the present teachings.

Reference will now be made, in detail, to presently preferred embodiments of the invention. Additional details of the invention are provided in the examples illustrated in the accompanying drawings.

Referring generally to FIG. 1, an aircraft taxi route display system 100 for capturing at least one of at least one taxi turn direction or at least one taxi distance, accepting from a user input a selection of at least one of at least one taxi turn direction or at least one taxi distance, clearing an aircraft taxi route from the selection of at least one of at least one taxi turn direction or at least one taxi distance, and displaying the aircraft taxi route. Aircraft taxi route display system 100 may include capturer module 102, accepter module 104, clearer module 106, and displayer module 108. Capturer module 102 may include acceptor module 124. Acceptor module 104 may include prompter module 126.

Aircraft taxi route display system 100 may include a user interface 128 including a display device 130 and a user input 132. A display device 130 may include any display device suitable for use in an aircraft. Some examples of a display device 130 suitable for use in an aircraft may include a digital display, such as a light-emitting diode (LED), a plasma display panel, and/or a liquid crystal display (LCD). An additional example of a display device 130 may include an analog display, such as a cathode ray tube (CRT). In one example, aircraft taxi route display system 100 may include a head-up display in which a taxi route may be displayed on a windshield. A head-up display may include a combiner and a projection unit. One example of a head-up display may include a helmet mounted display. In another example, aircraft taxi route display system 100 may include a taxi route displayed on an LCD screen. An LCD screen may include a thin, flat display device made up of color and/or monochrome pixels arrayed in front of a light source or reflector. Another example of a display may include a head down display. A head down display may include a rear projection information system which may be placed, for example, on a flight control panel.

The display may include a communications link capable of receiving at least one taxi route. A communication link 114 may include a wireless connection using a wireless device 116, such as a Wi-Fi connection, a VHF connection, and/or other radio frequencies. A taxi route may include a route and/or a path on an airport connecting ramps, hangars, and/or terminals. For example, an aircraft taxi route display system 100 may include a display device 130 with a VHF communications link to air traffic control 118 configured for receiving data including a taxi route. Additionally, the communication link 114 may receive at least one turn point and at least one exit point. A turn point may include a point in a taxi route where the route deviates. For example, a turn point in a taxi route may indicate the location for a taxiing aircraft to turn 90° to the right. An exit point may include a point where the aircraft may exit a runway and/or a current taxiway. For example, an exit point may indicate a location for an aircraft to exit a runway after landing and to enter a high speed exit taxiway for allowing the aircraft to vacate the runway in a short amount of time.

Additionally, the communication link 114 capable of receiving at least one taxi route may be capable of receiving a list of taxi routes sorted in order. The list of taxi routes may be sorted alphabetically, from the nearest taxi route to the farthest taxi route, and/or from the farthest taxi route to the nearest taxi route. For example, the communication link 114 may be capable of receiving a list of taxi routes sorted from the nearest taxi route to the farthest taxi route from an apron exit route. It is contemplated that other methods for sorting a list of taxi routes may be utilized. Further, the communication link 114 may include a communications link capable of communicating an International Civil Aviation Organization (ICAO) airline designator and/or other ICAO signage symbols. For example, the communications link may communicate airline designators as data from air traffic control 118. Other examples of ICAO signage symbols may include airport codes, such as LAX for Los Angeles International Airport, alphanumeric aircraft type codes, such as B744 for a specific Boeing 747 jet, telephony designators including a three-letter airline identifier and a one or two word designator, and/or an aircraft registration number, for example a specific tail number.

Further, the communications link capable of receiving at least one airport characteristic 120 may include a communication link 114 capable of receiving at least one taxi route from computer storage 110. Computer storage 110 may include computer components, devices, and recording media that retain digital data used for computing. Some examples of computer storage 110 may include random access memory (RAM), optical discs, such as a CD and/or a DVD, network storage, and/or magnetic storage, such as a hard disk. In one example, the communications link 114 capable of receiving at least one airport characteristic 120 may include a communication link 114 capable of receiving at least one taxi route from network storage via a wireless connection.

The communication link 114 capable of receiving at least one airport characteristic 120 may include a wireless communication link 114 capable of receiving at least one taxi route uplinked from air traffic control 118. A wireless communications link 114 may include any type of electrical or electronic operation which is accomplished without the use of a hard-wired connection and the transfer of information over a distance without the use of electrical conductors and/or wires. Some examples of a wireless connection may include the use of a 2.4 GHz WiFi device, communication devices utilizing radio frequency, such as VHF radio signals, and/or communication devices utilizing satellite communications links. Air traffic control 118 may include a service provided by ground-based controllers who direct aircraft on the ground and in the air and may include military and/or civilian air traffic controllers. Further, an airport characteristic 120 may be received from other sources. For example, another vehicle and/or aircraft having communication capability may transmit at least one airport characteristic 120.

A user input 132 may include an input that allows a user to manipulate the system. One example of a user input may include a touch interface including a graphical user interface, such as a touchscreen display having a combined input and output device. Another example of a user input 132 may include a keyboard, a mouse, a selecting switch, and/or a toggle switch. In one example, an aircraft taxi route display system 100 may include a user interface 128 having a touchscreen as a display device 130 and a user input 132. In another example, aircraft taxi route display system 100 may include a user interface 128 having a plasma display and a selecting switch.

Aircraft taxi route display system 100 may include a computer 134 including a computer processor 136 and computer storage 110, wherein the computer 134 is in communication with the user interface 128. A computer processor 136 may include any logic machine designed to execute a computer program. Computer storage 110 may include a computer component, device, and/or recording media designed to retain digital data and/or computer readable data. Some examples of computer storage 110 and/or a computer storage device may include random access memory, flash memory, optical storage media, such as a compact disc, and/or magnetic storage media, such as a floppy disk and/or a hard disk. In one example, aircraft taxi route display system 100 may include a computer processor 136 and a hard disk.

Additionally, the computer 134 may be in communication with the user interface 128. In one example, a computer 134 may communicate with a user interface 128 via a wired connection, such as an internal bus. In another example, a computer 134 may communicate via a wireless connection, such as a Wi-Fi connection.

Aircraft taxi route display system 100 may include a communication link 114 capable of receiving at least one airport characteristic 120, wherein the communication link 114 is in communication with the computer processor 136. A communication link 114 may include a digital datalink system for transmission of small messages between aircraft and ground stations via radio or satellite, such as the Aircraft Communications Addressing and Reporting System (or ACARS). Other examples of a communication link 114 may include using a very high frequency (VHF) radio frequency, a communications satellite (SATCOM or comsat), and/or a high frequency (HF) radio frequency. In one example, aircraft taxi route display system 100 may include a VHF radio frequency communications link. An airport characteristic 120 may include any distinguishing or identifiable part or location of an airport. Some examples of an airport characteristic 120 may include a runway, a terminal, a hangar, a ramp, a taxiway, airport signs, airport buildings, parking lots, a control tower, and/or a de-ice pad. In one example, aircraft taxi route display system 100 may include a SATCOM communications link capable of receiving a list of airport runways and taxiways.

In one example of capturing a taxi route clearance, illustrated generally in FIGS. 2 through 6, a typical air traffic control taxi route may be given as "Taxi via W5, W, W1 to Runway 30R." In this example, the first task is to capture and/or receive information regarding how to exit the apron, or to select an exit from the apron when at General Aviation Parking. This may be achieved by using a user input 132 to tab through possible exits from the apron. A text prompt may indicate that the user is selecting an exit point from the current pavement. In this example, the possible exits may include taxiway W6 and/or taxiway W5. The selector, such as a cursor, may switch between taxiway W6 and taxiway W5 as the user input 132 is utilized. When the selector is on the desired path, in this case W5, the user may select the location using the user input 132. The taxi route is then created from General Aviation Parking to the entry to taxiway W5.

Figure 4:
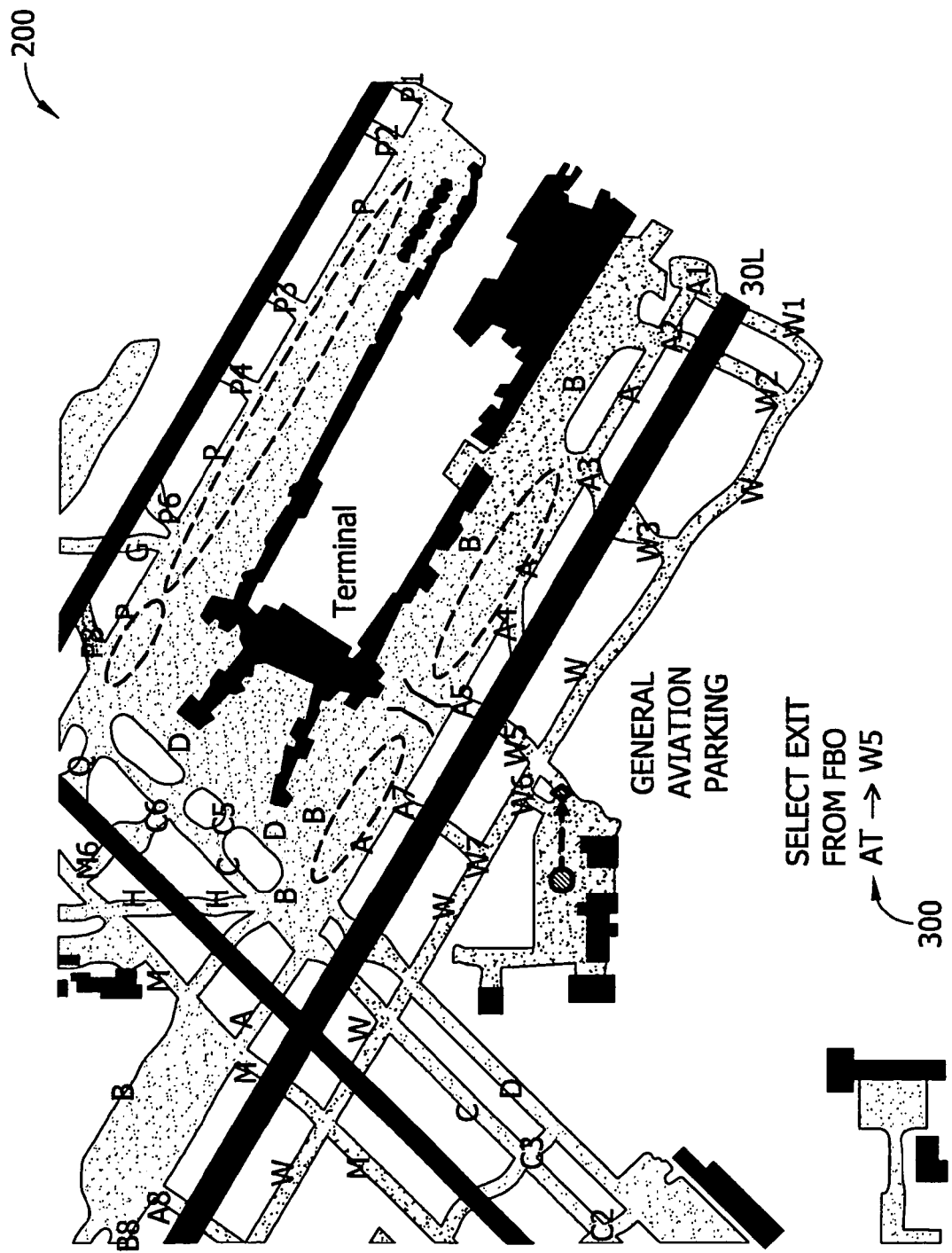
FIG. 4 illustrates an airport diagram display.

In FIG. 4 is an airport diagram 200 showing an example exit selection process with the tabbed selector at taxiway W5. A dashed arrow leads from the last point of the established taxi route to the next possible selection point. In one example, all possible exit points in any direction are part of the tab selection group. Using the user input 132 to move the selector to taxiway W6 may cause the diamond to move to taxiway W6, the dashed arrow to point to the diamond at taxiway W6, and the text box to change to taxiway W6.

Figure 5:
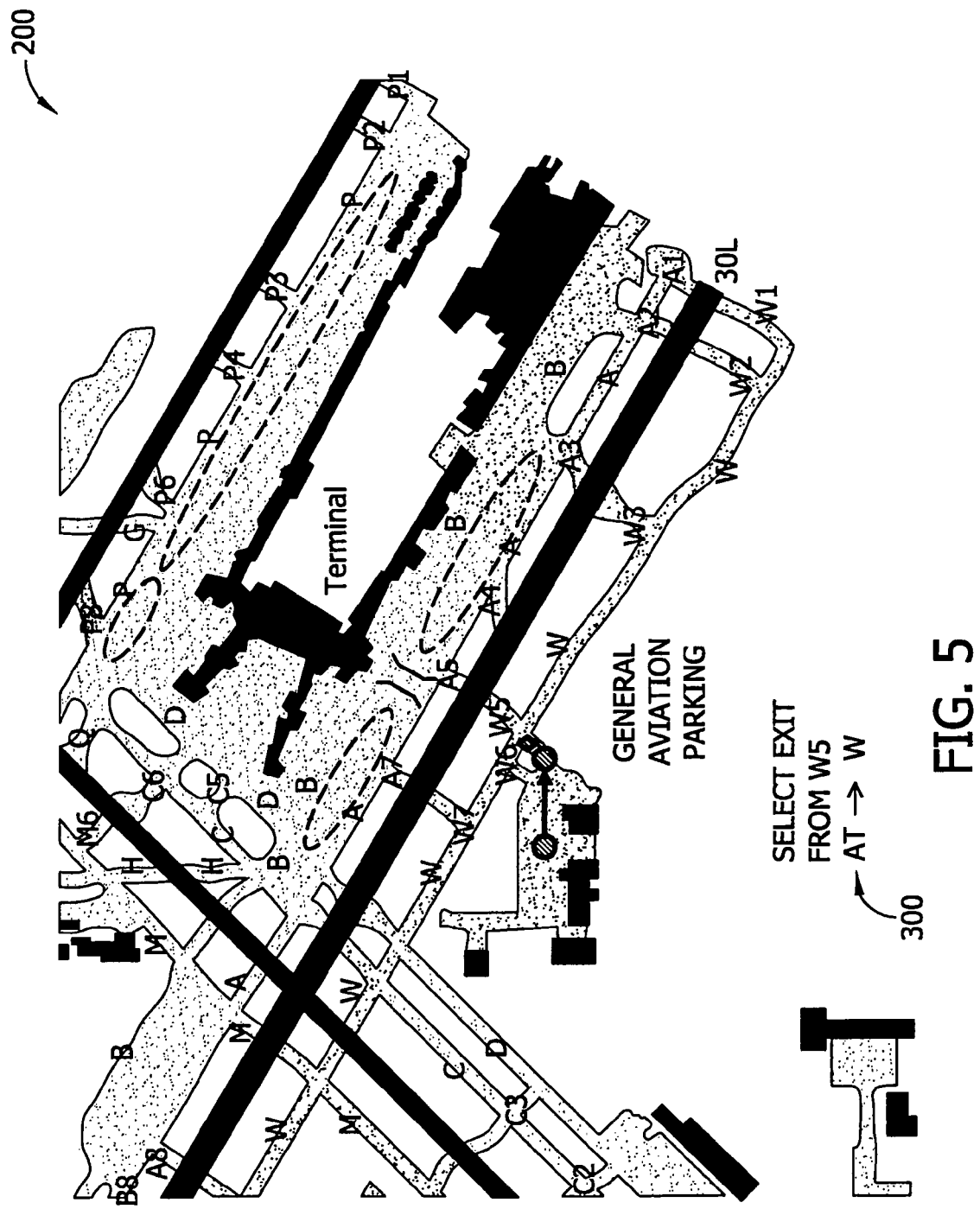
FIG. 5 illustrates an airport diagram display.

FIG. 5 illustrates the completion of the selection of taxiway W6 and begins the selection of the exit from taxiway W5. Because there is only one direction from the entry point of taxiway W5, the user may be prompted to select the exit point from taxiway W5. This may be performed by using the user input device to cycle through the possible exit points from taxiway W5. The possible exit points may be sorted in order from nearest to furthest. In this example and illustrated in FIG. 5, the possible exit points may include taxiway W and runway 12R/30L. (The W5 taxiway ends at the runway, and changes to taxiway A5 on the other side of the runway.) Again, the user may "select" the desired exit point which is taxiway W when the diamond is positioned as shown in FIG. 5.

Continuing with the same example, there are two directions to choose from on taxiway W. The user 138 may be prompted to choose the direction by cycling through the choices identified by the first intersection in each direction of travel. A textual prompt may indicate to the user 138 that the user may be selecting a direction or turn. In this example, the choices are taxiway W7 and taxiway W3. The user 138 may choose taxiway W3 as the direction, which is a right turn.

Figure 6:
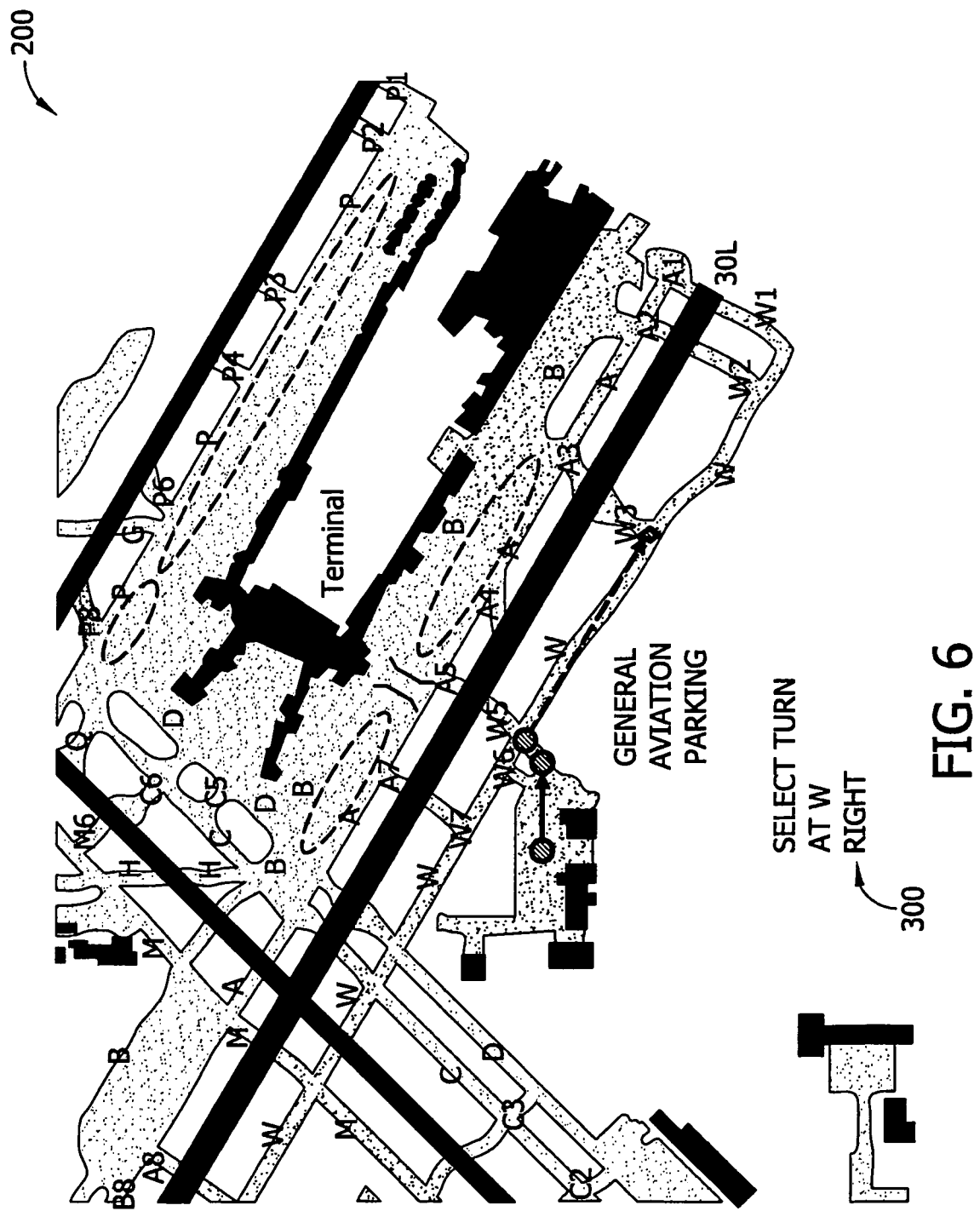
FIG. 6 illustrates an airport diagram display.

FIG. 6 shows the diamond selector on taxiway W3 prior to the user 138 selecting taxiway W3 and a right turn. Repeating the exit point selection process, the user 138 may select taxiway W1 as the desired exit point from the three choices, taxiway W3, taxiway W2, and taxiway W1. Because there is only one direction to go on taxiway W1, the user 138 may be prompted for an exit point on taxiway W1. In this example, runway 12R/30L represents the only exit point choice, so the user 138 may need to only press "select" to choose that exit point. When a runway is chosen as an exit point, a "hold short" instruction may be inserted into the taxi route. A "hold short" instruction may indicate an instruction to stop short and fast on a runway in order to avoid collision with another object, such as a landing and/or taxiing aircraft. An alternative approach may include inserting instructions to "hold short" every time a runway is crossed. In this example, the taxi route is captured and/or selected using a tab type control and a selector.

Figure 7:
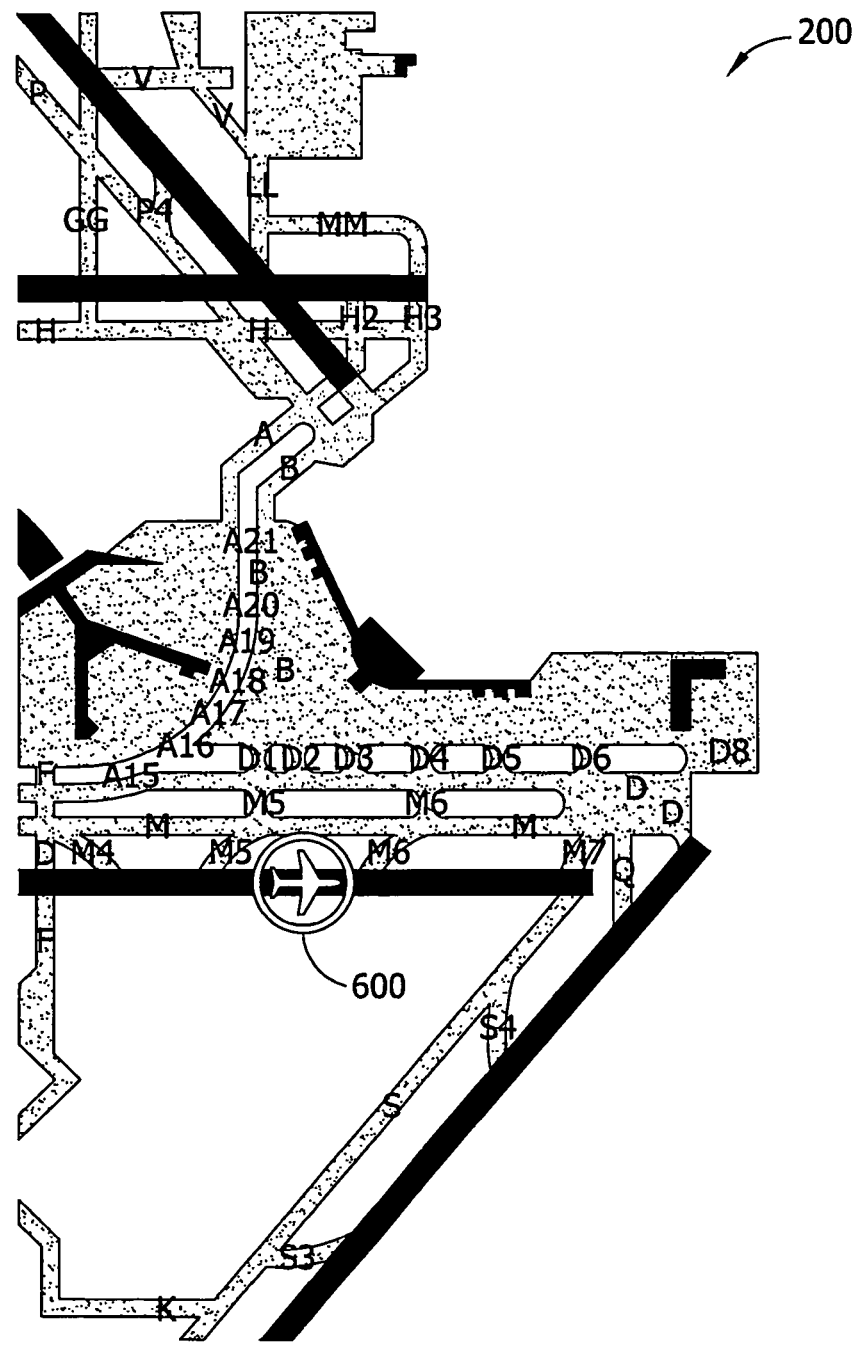
FIG. 7 illustrates an airport diagram display.

In a second example, a taxi route may be displayed. In this example, a taxi route may be uplinked to an aircraft by air traffic control 118. Alternatively, the taxi route may be communicated to the aircraft and manually entered into a user interface 128 and/or computer 134 communicating with a display device 130. In this example and illustrated in FIG. 7, a landed aircraft 600 is shown on Runway 10. A planned taxi route for the landed aircraft may include "Taxi via M7, D, D1, B, H3, MM, LL, to the ramp, Hold Short Runway 32R." Because of the hold short instructions, a further clearance may be issued once it is safe to cross Runway 32R.

As illustrated in FIG. 8, the proposed taxi route may be displayed utilizing ICAO signage symbols interspersed with turns, merges, taxiway names, hold short instructions, and distances, etc. Additional information provided may include the distance remaining to be traveled on each leg of the taxi route. The user interface 128 may include a readout showing the distance remaining. As an example and as illustrated in FIG. 8, the most current leg of the taxi route, shown at the far left of the taxi route summary 800 in FIG. 8, may show the distance remaining, which may include the remaining distance to the next turn. The entire display may disappear and/or shift, such as to the left, up, down, and/or right, as progress is made in the taxi route and as individual sections and/or legs of the taxi route may be completed. In one example, a "STOP" sign may be provided to capture and/or illustrate the "hold short" instruction and may be deleted when completed. The user 138 may be prompted by a popup box 900 to delete at least one of the sections and/or legs of the taxi route. Additionally, the user 138 may choose to cursor through the taxi route and delete any element through the use of a popup menu as shown in FIG. 9.

Figure 10:
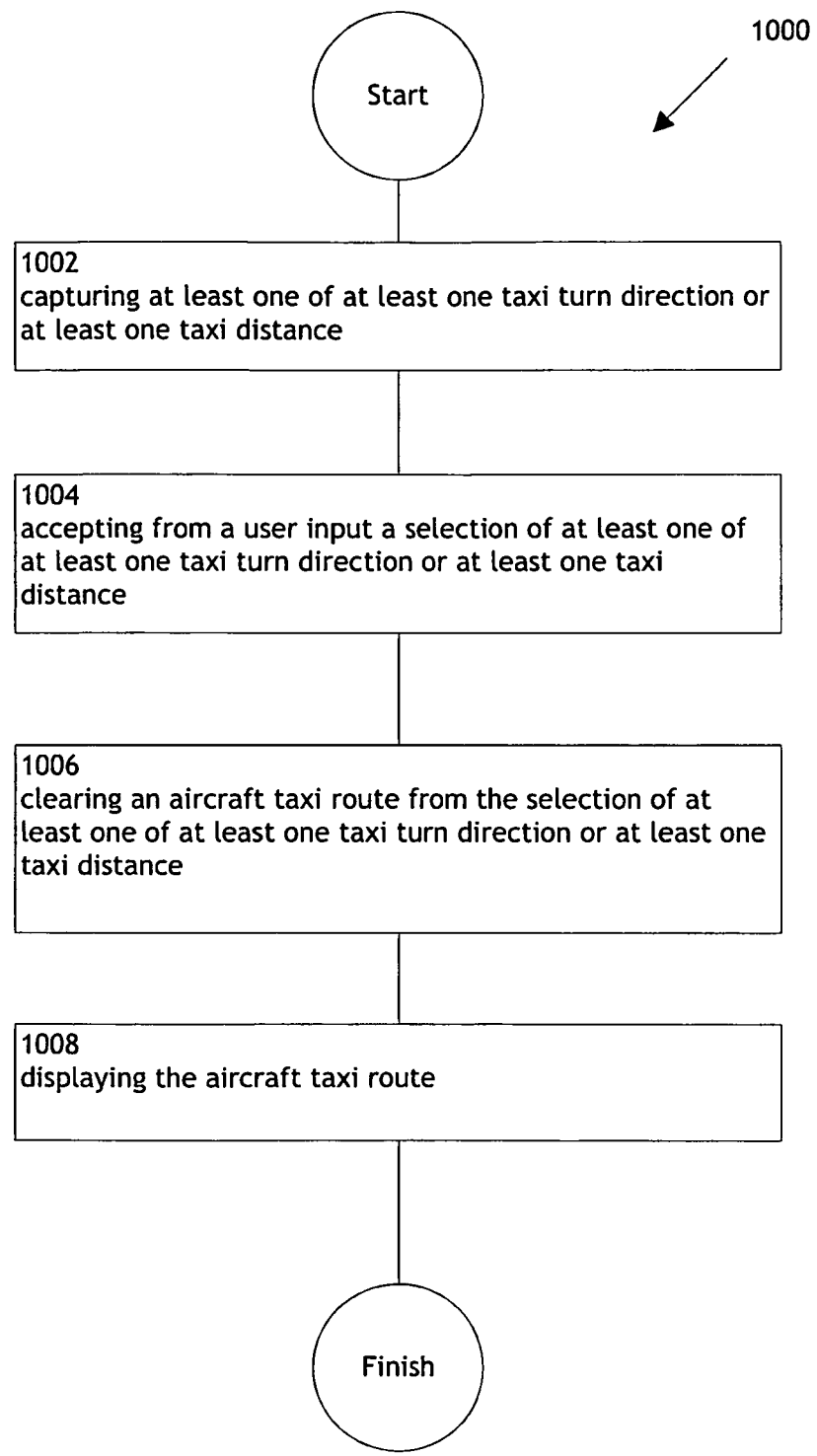
FIG. 10 illustrates an operational flow representing example operations related to providing an aircraft taxi route.

Referring generally to FIGS. 10 through 15, methods for providing a aircraft taxi route display system 100 are disclosed. FIG. 10 illustrates an operational flow 1000 representing example operations related to capturing at least one of at least one taxi turn direction or at least one taxi distance, accepting from a user input a selection of at least one of at least one taxi turn direction or at least one taxi distance, clearing an aircraft taxi route from the selection of at least one of at least one taxi turn direction or at least one taxi distance, and displaying the aircraft taxi route. In FIG. 10 and in following figures that include various examples of operational flows, discussion and explanation may be provided with respect to the above-described examples of FIGS. 1 through 9, and/or with respect to other examples and contexts. However, it should be understood that the operational flows may be executed in a number of other environments and contexts, and/or in modified versions of FIGS. 1 through 9. Also, although the various operational flows are presented in the sequence(s) illustrated, it should be understood that the various operations may be performed in other orders than those which are illustrated, or may be performed concurrently.

After a start operation, the operational flow 1000 moves to a capturing operation 1002, where capturing at least one of at least one taxi turn direction or at least one taxi distance may occur. For example, as generally shown in FIGS. 1 through 9, capturer module 102 may capture a set of airport characteristics 120 including interspersed taxi turn directions and taxi distances from computer storage 110. Capturer module 102 may include a computer processor, computer memory, and/or a communications link.

Then, in an accepting operation 1004, accepting from a user input a selection of at least one of at least one taxi turn direction or at least one taxi distance may occur. For example, as shown in FIGS. 1 through 9, accepter module 104 may accept a selection of at least one of at least one taxi turn direction or at least one taxi distance from a user interface 128 including a display device 130 and a user input 132. Accepter module 104 may include a computer processor.

Then, in a clearing operation 1006, clearing an aircraft taxi route from the selection of at least one of at least one taxi turn direction or at least one taxi distance may occur. For example, as shown in FIGS. 1 through 9, clearer module 106 may clear an aircraft taxi route from the selection of a set of taxi turn directions and a set of taxi distances. In one specific example, clearer module 106 clears a determined aircraft taxi route with air traffic control 118. Determiner module 104 may include a computer processor.

Then, in a displaying operation 1006, displaying the aircraft taxi route may occur. For example, as shown in FIGS. 1 through 9, displayer module 106 may display an aircraft taxi route. Displayer module 104 may include a computer processor, a display screen, such as an LCD screen, a head up display, and/or a projector.

Figure 11:
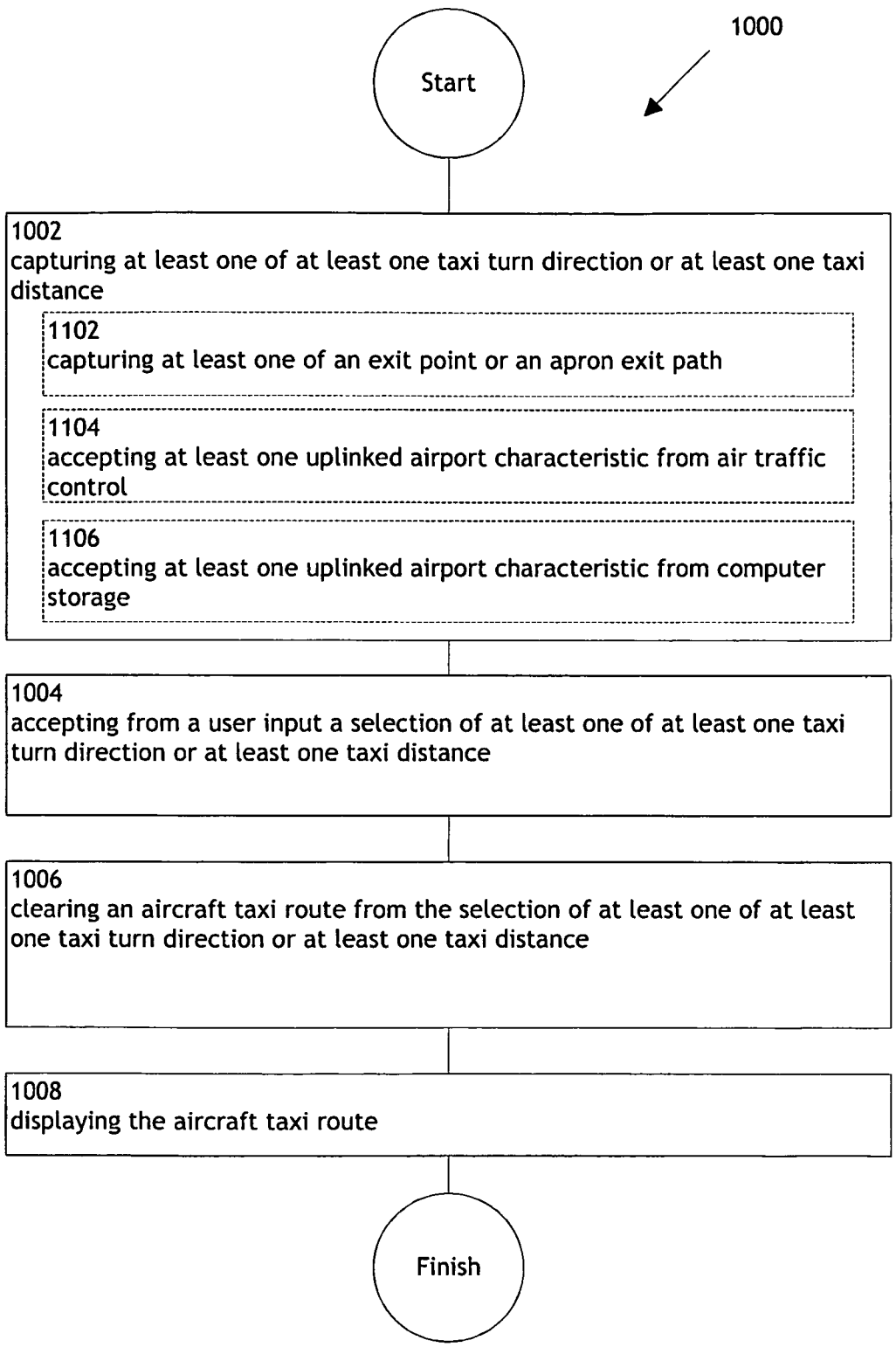
FIG. 11 illustrates an alternative embodiment of the operational flow of FIG. 10.

FIG. 11 illustrates alternative embodiments of the example operational flow 1000 of FIG. 10. FIG. 11 illustrates example embodiments where the capturing operation 1002 may include at least one additional operation. Additional operations may include an operation 1102, an operation 1104, and/or operation 1106.

At operation 1102, capturing at least one of an exit point or an apron exit path may occur. For example, capturer module 102 may capture multiple exit points and multiple apron exit paths for a user to select. Capturer module 102 may include a computer processor, computer memory, and/or a communications link. At operation 1104, accepting at least one uplinked airport characteristic from air traffic control may occur. For example, accepter module 124 may accept a database of uplinked airport characteristics 120 including taxiways and runways from air traffic control 118. In some instances, accepter module 124 may include a computer processor configured for accepting at least one airport characteristic 120 from air traffic control 118. At operation 1106, accepting at least one uplinked airport characteristic from computer storage may occur. For example, accepter module 124 may accept a database of uplinked airport characteristics 120 including taxiways and runways from computer storage 110 including from a hard disk. In some instances, accepter module 124 may include a computer processor configured for accepting at least one airport characteristic 120 from computer storage 110.

Figure 12:
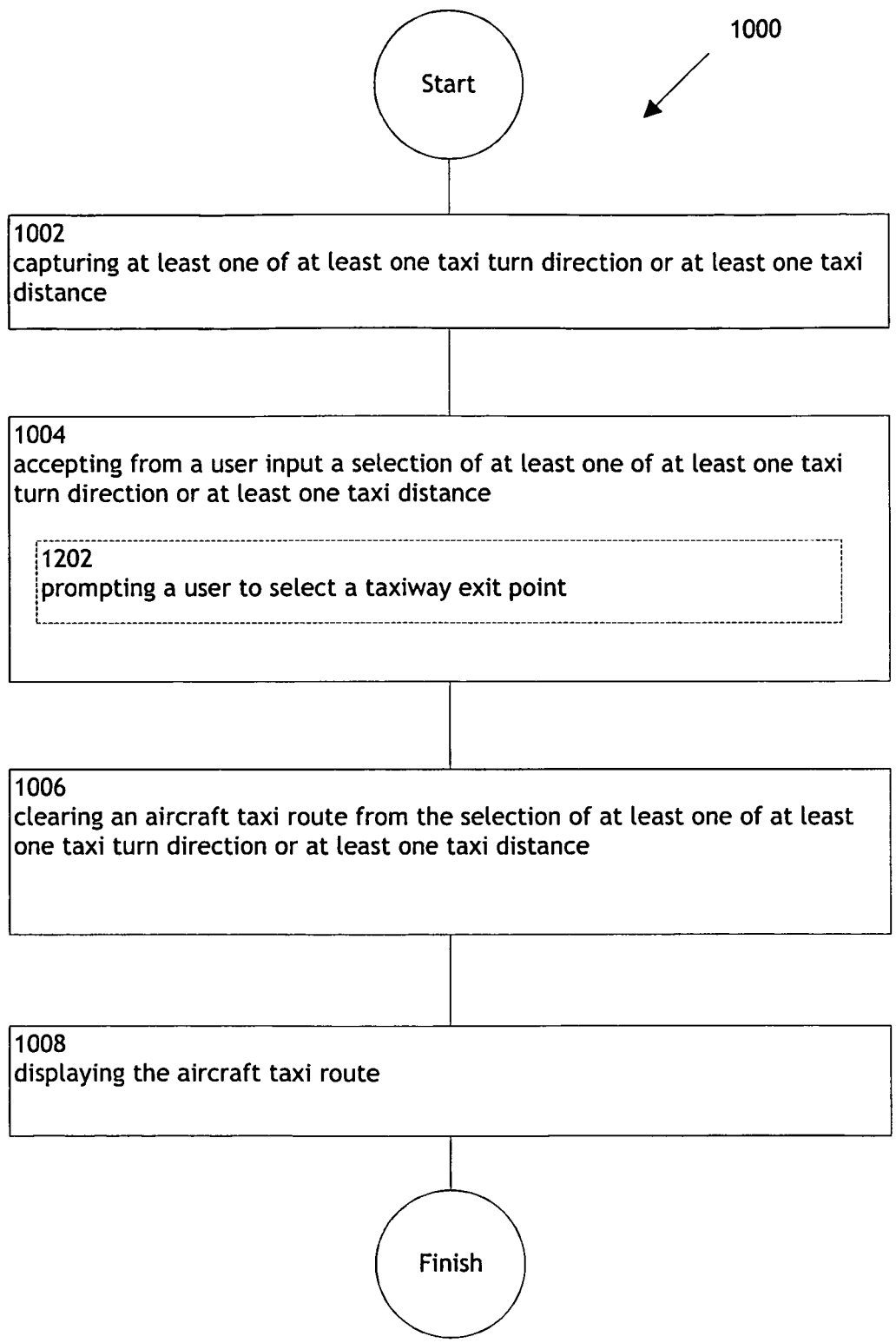
FIG. 12 illustrates an alternative embodiment of the operational flow of FIG. 10.

FIG. 12 illustrates alternative embodiments of the example operational flow 1000 of FIG. 10. FIG. 12 illustrates example embodiments where the accepting operation 1004 may include at least one additional operation. Additional operations may include an operation 1202. At operation 1202, prompting a user to select a taxiway exit point may occur. For example, prompter module 126 may prompt a user by showing a message on display device 130 to select a taxiway exit point. Prompting may include sending a message to a user 138, such as selection prompter 300, or reminding a user 138 to perform any action, such as selecting a taxiway exit point. Prompter module 126 may include a computer processor.

Figure 13:
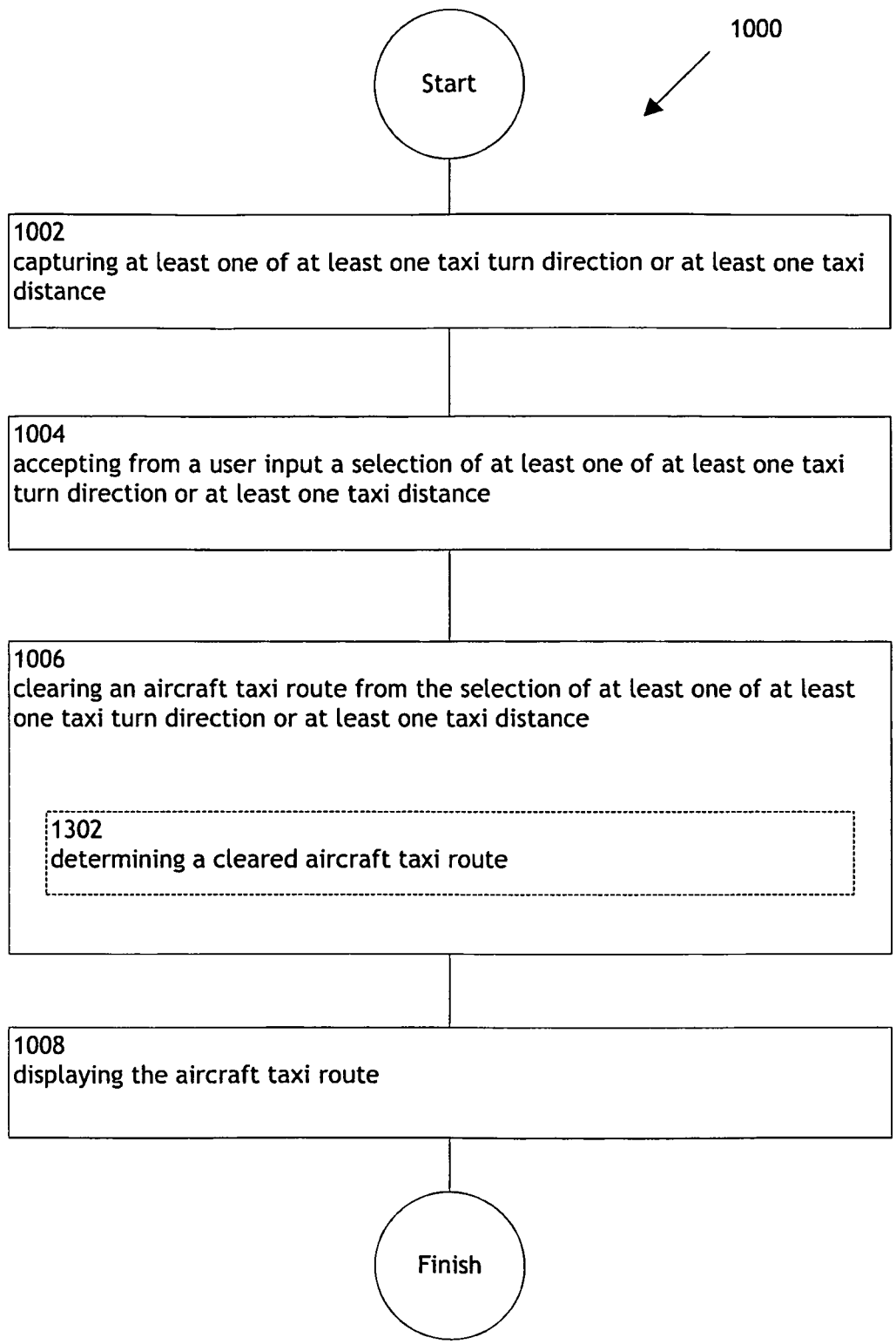
FIG. 13 illustrates an alternative embodiment of the operational flow of FIG. 10.

FIG. 13 illustrates alternative embodiments of the example operational flow 1000 of FIG. 10. FIG. 13 illustrates example embodiments where the determining operation 1006 may include at least one additional operation. Additional operations may include an operation 1302. At operation 1302, clearing an aircraft taxi route may occur. For example, clearer module 106 may clear an aircraft taxi route with air traffic control 118. A selected aircraft taxi route may need to be approved and/or suggested by air traffic control before permission may be given to the aircraft to taxi. Clearer module 106 may include a computer processor in communication with a communication link 114.

Figure 14:
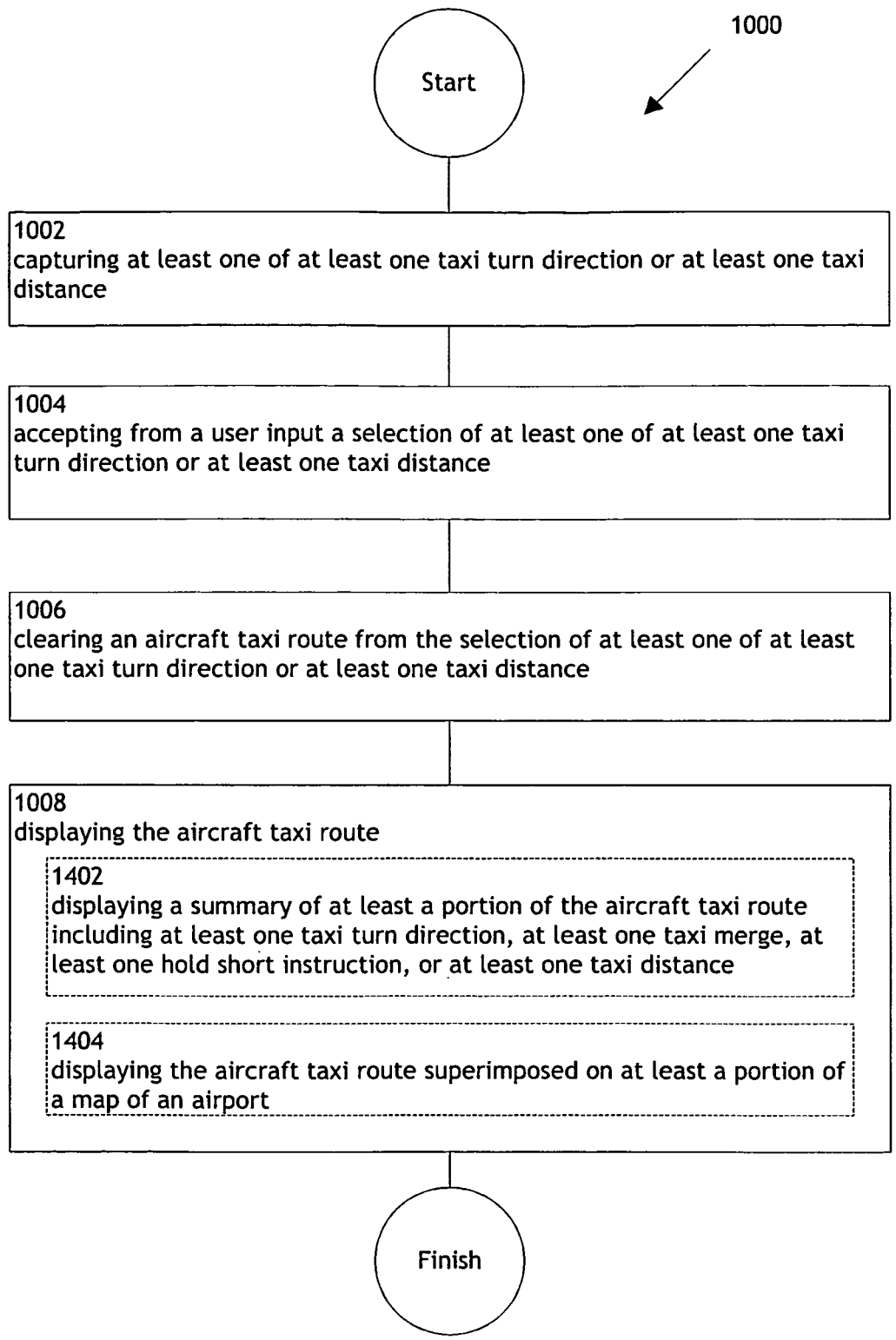
FIG. 14 illustrates an alternative embodiment of the operational flow of FIG. 10.

FIG. 14 illustrates alternative embodiments of the example operational flow 1000 of FIG. 10. FIG. 14 illustrates example embodiments where the displaying operation 1008 may include at least one additional operation. Additional operations may include an operation 1402 and/or an operation 1404.

At operation 1402, displaying a summary of at least a portion of the aircraft taxi route including at least one taxi turn direction, at least one taxi merge, at least one hold short instruction, or at least one taxi distance may occur. For example, displayer module 108 may show on display device 130 a summary of an aircraft taxi route including a set of taxi turn directions, taxi merges, hold short instructions, and taxi distances. Displayer module 108 may include a computer processor in communication with a user interface 128. At operation 1404, displaying the aircraft taxi route superimposed on at least a portion of a map of an airport may occur. For example, displayer module 108 may show on display 130 an aircraft taxi route superimposed on an airport diagram 200. The airport diagram 200 may include a transparent map and/or a background map shown on a display. The aircraft taxi route may be shown as a marked path on selected taxiways, runways, and/or other airport paths, generally shown in FIGS. 2-7. Displayer module 108 may include a computer processor in communication with a user interface 128, display 130, and/or user input 132.

It is believed that the present technology and many of its attendant advantages will be understood from the foregoing description, and it will be apparent that various changes may be made in the form, construction, and arrangement of the components thereof without sacrificing all of its material advantages. The form herein before described being merely explanatory embodiments thereof, it is the intention of the following claims to encompass and include such changes.

What is claimed is:

1. An aircraft taxi route display system, comprising:
a user interface including a display device and a user input;
a computer including a computer processor and a computer storage device, the computer processor configured to run a clearer module; wherein the computer is in communication with the user interface,
a communications link capable of receiving at least one airport characteristic and at least one aircraft taxi route supplied from air traffic control, the aircraft taxi route including at least one turn point and at least one exit point indicating where the aircraft may exit a runway or taxiway;
wherein the communications link is in communication with the computer processor, the computer processor is configured to present the at least one aircraft taxi route on an airport map image viewable on said display device, the clearer module is configured to clear the aircraft taxi route with air traffic control via the communications link for approval to proceed along the aircraft taxi route, the airport map image including the airport characteristic viewable on said display device, the airport characteristic including a terminal, aircraft parking lot and runway; the computer processor is further configured to present a section by section summary including ICAO signage symbols interspersed with a turn, taxiway name, and a distance remaining to be traveled on each section of the at least one aircraft taxi route, the section by section summary being provided separate from the airport map image.

2. The aircraft taxi route display system of claim 1, wherein the user interface including a display device and a user input comprises:
at least one of a head up display or a head down display.

3. The aircraft taxi route display system of claim 1, wherein the user interface including a display device and a user input comprises:
a set of at least one of at least one turn indicator or at least one direction indicator.

4. The aircraft taxi route display system of claim 1, wherein the user interface including a display device and a user input comprises:
a display including at least one of at least one selected taxi turn direction or at least one selected taxi distance.

5. The aircraft taxi route display system of claim 1, wherein the communications link capable of receiving at least one aircraft taxi route comprises:
   a communications link capable of receiving at least one of at least one turn point or at least one exit point.

6. A method, implemented as a set of instructions stored in a memory and executed by a computer, comprising:
   receiving a list of taxi routes, the list of taxi routes sorted in order and includes at least one taxi route from a computer storage and at least one taxi route uplinked from and approved and suggested by air traffic control, the aircraft taxi route including at least one turn point and at least one exit point indicating where the aircraft may exit a runway or taxiway;
   capturing at least one of at least one taxi turn direction or at least one taxi distance;
   accepting from a user input a selection of at least one of at least one taxi turn direction or at least one taxi distance;
   clearing an aircraft taxi route with air traffic control to proceed along the aircraft taxi route from the selection of at least one of at least one taxi turn direction or at least one taxi distance;
   displaying the aircraft taxi route on an airport map image; and
   displaying a section by section summary including ICAO signage symbols interspersed with a turn, taxiway name, and a distance remaining to be traveled on each section of the aircraft taxi route, the section by section summary being displayed separate from the airport map image.

7. The method of claim 6, wherein the capturing at least one of at least one taxi turn direction or at least one taxi distance comprises:
   capturing at least one of an exit point or an apron exit path.

8. The method of claim 6, wherein the accepting from a user input a selection of at least one of at least one taxi turn direction or at least one taxi distance comprises:
   prompting a user to select a taxiway exit point.

9. The method of claim 6, wherein the displaying the aircraft taxi route comprises:
   displaying the aircraft taxi route superimposed on at least a portion of a map of an airport.

10. The aircraft taxi route display system of claim 1, wherein said display device is a touchscreen display device.

11. The aircraft taxi route display system of claim 1, wherein the distance remaining to be traveled on each section of the at least one aircraft taxi route on said display device includes a distance associated with each section remaining on the at least one taxi route.

12. The aircraft taxi route display system of claim 11, wherein the distance remaining to be traveled on each section of the at least one aircraft taxi route includes a remaining distance displayed for a current section of the at least one aircraft taxi route.

13. The aircraft taxi route display system of claim 11, wherein the display device presents a total remaining distance for the at least one aircraft taxi route.

14. The method of claim 6, wherein displaying a section by section summary including ICAO signage symbols interspersed with a turn, taxiway name, and a distance remaining to be traveled on each section of the aircraft taxi route includes displaying a distance associated with each section remaining on the at least one taxi route.

15. The method of claim 14, wherein displaying a section by section summary including ICAO signage symbols interspersed with a turn, taxiway name, and a distance remaining to be traveled on each section of the aircraft taxi route includes displaying a remaining distance displayed for a current section of the at least one aircraft taxi route.

16. The method of claim 14, wherein displaying a section by section summary including ICAO signage symbols interspersed with a turn, taxiway name, and a distance remaining to be traveled on each section of the aircraft taxi route includes displaying a total remaining distance for the at least one aircraft taxi route.

\* \* \* \* \*